(12) United States Patent
Ajichi et al.

(10) Patent No.: US 8,345,188 B2
(45) Date of Patent: Jan. 1, 2013

(54) ILLUMINATION DEVICE AND LIQUID CRYSTAL DISPLAY DEVICE

(75) Inventors: Yuhsaku Ajichi, Osaka (JP); Kenji Nishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 185 days.

(21) Appl. No.: 12/865,739

(22) PCT Filed: Nov. 20, 2008

(86) PCT No.: PCT/JP2008/071073
§ 371 (c)(1),
(2), (4) Date: Aug. 2, 2010

(87) PCT Pub. No.: WO2009/128178
PCT Pub. Date: Oct. 22, 2009

(65) Prior Publication Data
US 2011/0001899 A1 Jan. 6, 2011

(30) Foreign Application Priority Data

Apr. 18, 2008 (JP) ................................. 2008-108916

(51) Int. Cl.
*G02F 1/1335* (2006.01)
*G02F 1/13357* (2006.01)

(52) U.S. Cl. ........... 349/65; 349/62; 362/97.1; 362/97.2

(58) Field of Classification Search .............. 349/62–64, 349/65; 362/97.1, 97.2, 97.3, 97.4
See application file for complete search history.

(56) References Cited

U.S. PATENT DOCUMENTS

| 6,241,358 | B1 | 6/2001 | Higuchi et al. | |
| 2001/0017774 | A1 | 8/2001 | Ito et al. | |
| 2002/0197051 | A1 | 12/2002 | Tamura et al. | |
| 2003/0152356 | A1* | 8/2003 | Fritz et al. | ........................ 385/138 |
| 2007/0058388 | A1* | 3/2007 | Takatori et al. | ................ 362/554 |
| 2009/0316072 | A1 | 12/2009 | Okumura et al. | |

FOREIGN PATENT DOCUMENTS

| JP | 11-288611 A | 10/1999 |
| JP | 2000-171641 A | 6/2000 |
| JP | 2001-312916 A | 11/2001 |
| JP | 2003-043266 A | 2/2003 |
| JP | 2004-206916 A | 7/2004 |
| JP | 2005-018993 A | 1/2005 |
| JP | 2007-335323 A | 12/2007 |

OTHER PUBLICATIONS

Official Communication issued in International Patent Application No. PCT/JP2008/071073, mailed on Dec. 16, 2008.

* cited by examiner

*Primary Examiner* — Uyen Chau N Le
*Assistant Examiner* — Michael Mooney
(74) *Attorney, Agent, or Firm* — Keating & Bennett, LLP

(57) ABSTRACT

A backlight (illumination device) of this invention includes a plurality of light source units (12) each including (i) at least one light source (5) and (ii) a light guide body (7) for surface-emitting light which has come from the at least one light source. In the light source unit (12), the light source is disposed at one end portion of the light guide body (7), and another end portion of the light guide body (7), opposite to the one end portion, has a thickness from 0.05 mm to 0.15 mm. As a result, it is possible to further improve luminance uniformity in an illumination device including a plurality of light guide bodies.

8 Claims, 11 Drawing Sheets

ILLUMINATION DEVICE AND LIQUID CRYSTAL DISPLAY DEVICE

TECHNICAL FIELD

The present invention relates to an illumination device used as, e.g., a backlight of a liquid crystal display device, and to a liquid crystal display device including the illumination device.

BACKGROUND ART

In recent years, liquid crystal display devices have become common, in place of cathode-ray tube devices. Merits of the liquid crystal display devices in terms of low energy consumption, thinness, lightness and the like have indeed enabled them to be used in a wide variety of applications, such as liquid crystal display televisions, monitors, and portable telephones. The improvement of an illumination device (also called a backlight) provided behind a liquid crystal display device has been suggested as a way to further enhance the above merits.

The illumination devices are generally divided in two main categories: side light type illumination devices (also called edge light type illumination devices) and direct type illumination devices. A side light type illumination device is configured so that a light guide body is provided behind a liquid crystal display panel and a light source is provided at an end portion of the light guide body. Light emitted from the light source is reflected by the light guide body, and is indirectly and evenly irradiated onto the liquid crystal display panel. With this configuration, it is possible to achieve an illumination device having both a thin-structure and excellent luminance uniformity, although its luminance is low. For this reason, the side light type illumination devices are mainly used in small- and medium-sized liquid crystal displays, such as portable telephones and laptop computers.

An example of the side light type illumination device is proposed in Patent Literature 1. Patent Literature 1 mentions a surface light-emitting device including a light guide body having a reflecting surface on which a plurality of dots are formed so that a light-emitting surface emits light uniformly. In this surface light-emitting device, light does not reach corners of the reflecting surface due to directivity of a light source, which results in the corners of the reflective side becoming dark. In order to avoid this, this surface light-emitting device has the dots provided so that their density becomes higher in the corners of the reflecting surface than in the other parts of the reflecting surface.

On the other hand, a direct type illumination device includes a plurality of light sources disposed behind a liquid crystal display panel so as to directly emit light to the liquid crystal display device. Accordingly, the direct type illumination device can easily achieve a high luminance even with a large screen. The direct-type illumination devices are therefore mainly used in large-size liquid crystal displays having a screen size of 20 inches or over. In this regard, existing direct type illumination devices are as thick as 20 mm to 40 mm. This prevents further reduction in the thickness of the display.

In this view, shortening a distance between the light sources and the liquid crystal display panel would make it possible to achieve an even thinner large liquid crystal display device; however, in such a case, it is necessary to increase the number of light sources in order to obtain luminance uniformity of the illumination device. The increase in the number of light sources, however, results in a cost increase. For this reason, it has been desired to develop a thin illumination device having excellent luminance uniformity, without any increase in the number of light sources.

Conventional technologies have attempted to solve the above problem. An objective of these attempts is to achieve thinner large liquid crystal displays by providing a plurality of side light type illumination devices.

For example, Patent Literature 2 proposes a surface light source device which can be suitably used in a large liquid crystal display, because the surface light source device can secure a wide light-emitting area with a compact structure. This surface light source device includes (i) plate-like light guide blocks arranged in a tandem manner and (ii) a primary light source to supply first light to each of the light guide blocks.

Illumination devices constituted by aligning a plurality of light-emitting units each including a combination of a light source and a light guide body, as the one described above, are called tandem-type illumination devices.

CITATION LIST

Patent Literature 1

Japanese Patent Application Publication, Tokukai, No. 2003-43266 (Publication Date: Feb. 13, 2003)

Patent Literature 2

Japanese Patent Application Publication, Tokukaihei, No. 11-288611 (1999) (Publication Date: Oct. 19, 1999)

Patent Literature 3

Japanese Patent Application Publication, Tokukai, No. 2001-312916 (Publication Date: Nov. 9, 2001)

SUMMARY OF INVENTION

However, an illumination device constituted by combining light guide bodies and light sources as above has the following problem: when the plurality of light guide bodies is disposed planarly, bright lines appear in areas respectively corresponding to joint portions between the light guide bodies, thereby causing non-uniform luminance. As a result, such an illumination device still cannot achieve luminance uniformity.

The following describes why the bright lines occur. FIG. 4 is a cross sectional view schematically illustrating an arrangement of light guide bodies included in a tandem-type backlight. Further, FIGS. 6 and 7 are views each schematically illustrating a traveling direction of light propagating through the light guide body.

As shown in FIG. 4, one of the light guide bodies (on the left in FIG. 4) and another of the light guide bodies (adjoining the one light guide body; on the right in FIG. 4) are arranged so that they overlap without any gap. As shown in FIG. 6, most of the light emitted from the light source propagates through the light guide body while being repeatedly total-reflected, so as to be emitted from a light-emitting surface to the outside. However, as shown in FIG. 7, a part of the light emitted from the light source is not total-reflected inside the light guide body and thus reaches directly an end surface (7e) located the furthest away from the light source. Such light has a high intensity, because there is no loss in its amount caused by the total reflection. As a result, the light emitted from the end surface (7e) appears as a bright line.

With the arrangement shown in FIG. 4, the light emitted from the end surface (7e) of the another light guide body (right side in FIG. 4) which end surface (7e) is located the furthest away from the light source included in the another light guide body enters the one light guide body (left side on FIG. 4) and propagates through the one light guide body (indicated by an arrow in bold in FIG. 4). Then, the light is repeatedly total-reflected inside the one light guide body, and is then emitted from the light-emitting surface of the one light guide body. In this way, according to the arrangement shown in FIG. 4, the plurality of light guide bodies forms a non-interrupted light-emitting surface; therefore, it is possible to obtain uniform luminance without the occurrence of bright lines.

However, in practical use, light guide bodies are generally manufactured with a minus tolerance, in consideration of a possible damage occurring between light guide bodies, of thin-structure illumination devices, and of manufacturing errors. As a result, as shown in FIG. 5, a gap corresponding to the tolerance is created in a joint portion between one light guide body and another light guide body. Consequently, light emitted from the end surface (7e) of the another light guide body which end surface (7e) is located the furthest away from the light source included in the another light guide body is diverged into (i) light entering the one light guide body and (ii) light (indicated by an arrow in bold in FIG. 5) which is emitted upwards without entering the one light guide body. Such light emitted from the end surface (7e), which is not a light-emitting surface, has a higher luminance, because an amount of this light is larger than that of the light outputted from the light-emitting surface. As a result, the light emitted upwards through the end surface (7e) appears as a bright line.

The above-described problem of the occurrence of the bright lines exists not only in tandem-type backlights, but also in backlights (called tile-type backlights) including, as shown in FIG. 14, a plurality of light guide bodies arranged on one common flat surface without overlap.

In order to solve the above problem of the bright lines, Patent Literature 3 for example discloses a configuration in which a dot pattern for diffusing light emitted from a light guide plate is disposed between light guide bodies and a diffusing plate so as to cover entire surfaces of the light guide bodies and the diffusing plate. This configuration enables diffusion of the light which would potentially appear as a bright line, thereby reducing a degree of luminance non-uniformity.

With the above configuration, it is thus possible to improve, to a certain degree, the problem related to luminance non-uniformity caused by bright lines; however, other problems arise, such as luminance non-uniformity caused by the dot pattern. Although the dot pattern functions to diffuse light for uniform luminance, it is difficult for the dot pattern to provide completely uniform luminance. In view of this, the dots in the dot pattern are disposed so as to have different distribution densities depending on the distance from a light source. Such dot pattern affects luminance non-uniformity.

Further, Patent Literature 3 discloses a configuration including a light-shielding layer on an end surface from which the light potentially causing bright lines is to be emitted. This configuration makes it possible to block high-luminance light emitted from the end surface, thereby suppressing occurrence of bright lines. However, in this configuration, the end surface does not emit light, and therefore an area corresponding to the end surface appears as a dark line. As such, this configuration still cannot achieve uniform luminance.

Consequently, using such illumination device as a backlight in a display device impairs display quality.

The present invention was made in view of the above problems. An object of the present invention is to provide an illumination device, including a plurality of light guide bodies, capable of further improving luminance uniformity.

In order to solve the above problems, an illumination device in accordance with the present invention includes a plurality of light source units each including (i) at least one light source and (ii) a light guide body for surface-emitting light which has come from the at least one light source, the light guide body having one end portion in which the at least one light source is provided, and the light guide body having another end portion, opposite to the one end portion, whose thickness is from 0.05 mm to 0.15 mm.

Here, the thickness of the light guide body refers to a width of the light guide body in a direction perpendicular to a light-emitting surface of the illumination device.

With the above configuration, the thickness of the another end of the light guide body which another end portion is opposite to the one end portion in which the light source is provided is set to 0.15 mm or less. This makes it possible to sufficiently weaken an intensity of the light emitted from the another end portion, thereby suppressing brightness of a bright line to a degree with which no problem occurs in practical use.

The expression "bright line" refers to a portion brighter than the other portions of the light-emitting surface, the portion being created by high-intensity light emitted from an end surface of a light guide body, the end surface being located in a boundary between two adjoining light guide bodies. The above configuration makes it possible to reduce a difference in brightness between a bright line and the other portions of the light-emitting surface.

In this way, it is possible to obtain an illumination device having further improved luminance uniformity.

In a case where a thickness of an end portion of the light guide body is below 0.05 mm, the end portion of the light guide body is easy to be broken. On the other hand, setting the thickness of the end portion of the light guide body to 0.05 mm or more as above makes it possible to maintain a strength of the light guide body at a level with which no problem occurs in a practical use.

Further, with the illumination device in accordance with the present invention, by changing a shape of the light guide body itself (i.e., setting the thickness of the end portion of the light guide body to 0.05 mm or more and not more than 0.15 mm), it is possible to suppress the occurrence of bright lines and dark lines, without providing additional members such as the light-shielding layer mentioned in Patent Literature 3.

In order to solve the above problems, an illumination device in accordance with the present invention includes a plurality of light source units each including (i) at least one light source and (ii) a light guide body for surface-emitting light which has come from the at least one light source, the light guide body having an end portion whose thickness is from 0.05 mm to 0.15 mm, the end portion corresponding to an area in which a bright line appears due to light from the at least one light source.

Here, the thickness of the light guide body refers to a width of the light guide body in a direction perpendicular to a light-emitting surface of the illumination device.

With the above configuration, the thickness of the end portion of the light guide body which end portion corresponds to the area in which a bright line appears is set to 0.15 mm or less. This makes it possible to sufficiently weaken an intensity of the light emitted from the end portion, thereby suppressing brightness of a bright line to a degree with which not problem occurs in practical use.

The expression "bright line" refers to a portion brighter than the other portions of the light-emitting surface, the portion being created by high-intensity light emitted from an end surface of a light guide body, the end surface being located in a boundary between two adjoining light guide bodies. The above configuration makes it possible to reduce a difference in brightness between a bright line and the other portions of the light-emitting surface.

In this way, it is possible to obtain an illumination device having further improved luminance uniformity.

In a case where a thickness of an end portion of the light guide body is below 0.05 mm, the end portion of the light guide body is easy to be broken. On the other hand, setting the thickness of the end portion of the light guide body to 0.05 mm or more as above makes it possible to maintain a strength of the light guide body at a level with which no problem occurs in a practical use.

Further, with the illumination device in accordance with the present invention, by changing a shape of the light guide body itself (i.e., setting the thickness of the end portion of the light guide body to 0.05 mm or more and not more than 0.15 mm), it is possible to suppress the occurrence of bright lines and dark lines, without providing additional members such as the light-shielding layer mentioned in Patent Literature 3.

In the illumination device in accordance with the present invention, the light guide body may include (i) a light-emitting section having a light-emitting surface and (ii) a light guide section for guiding light which has come from the at least one light source to the light-emitting section, wherein among the plurality of light source units, a first light source unit and a second light source unit adjoining the first light source unit may be disposed so that a light-emitting section of a light guide body of the second light source unit is placed on a light guide section of a light guide body of the first light source unit.

With the above configuration, it is possible to achieve a tandem-type illumination device. Further, by setting the thickness of the end portion of the light guide body as above, it is possible to reduce an amount of light emitted from an end surface located the furthest away from the light source which end surface is not the light-emitting surface, and accordingly to improve luminance uniformity.

In the illumination device in accordance with the present invention, among the plurality of light source units, a first light source unit and a second light source unit adjoining the first light source unit may be disposed so as not to overlap each other.

With the above configuration, it is possible to achieve a tile-type illumination device. Further, by setting the thickness of the end portion of the light guide body as above, it is possible to suppress the occurrence of a bright line formed by high-intensity light emitted from an end surface of each light guide body, the end surface located in a boundary between two adjoining light guide bodies. Consequently, it is possible to increase luminance uniformity.

In the illumination device as above, the at least one light source in each of the plurality of light source units may include at least a pair of light sources, and the pair of light sources may be disposed so as to face each other.

With the above arrangement, the light sources disposed so as to face each other can emit light so that light emitted from one of the light sources reaches a region (dead area) where light emitted from another of the light sources cannot reach, and vice versa. This makes it possible to improve luminance uniformity of the illumination device, since light emitted from each light source is emitted from an entire light emitting surface so that the light sources irradiates their dead areas with each other.

In the illumination device as above, the light guide body may be shaped so as to be thicker as becoming more distant from end portions in which the pair of light sources are provided, respectively.

In other words, with the above configuration, the light guide bodies included in the illumination device each have a light-emitting surface shaped in a chevron having two sloped surfaces.

In order to solve the above problems, a liquid crystal display device in accordance with the present invention, includes as a backlight, any one of the above illumination devices.

With this configuration, it is possible to achieve a liquid crystal display device having excellent luminance uniformity, since the liquid crystal display device includes an illumination device in accordance with the present invention.

With the illumination device in accordance with the present invention, by changing a shape of the light guide body itself, it is possible to suppress the occurrence of bright lines. This eliminates a need for disposing a light guide plate and a diffusing plate while maintaining an adequate distance therebetween for luminance uniformity, as mentioned in Paragraph [0077] of Patent Literature 3, thereby making it possible to reduce the thickness of the liquid crystal display device. In view of this, the present invention is preferably used as a backlight of a liquid crystal display device having an overall thickness of 20 mm or less.

A fuller understanding of additional objectives, characteristics and strengths of the present invention can be obtained through the ensuing description. Further, the advantages of the present invention will be evident from the following description in reference to the accompanying drawings.

Figure 8:
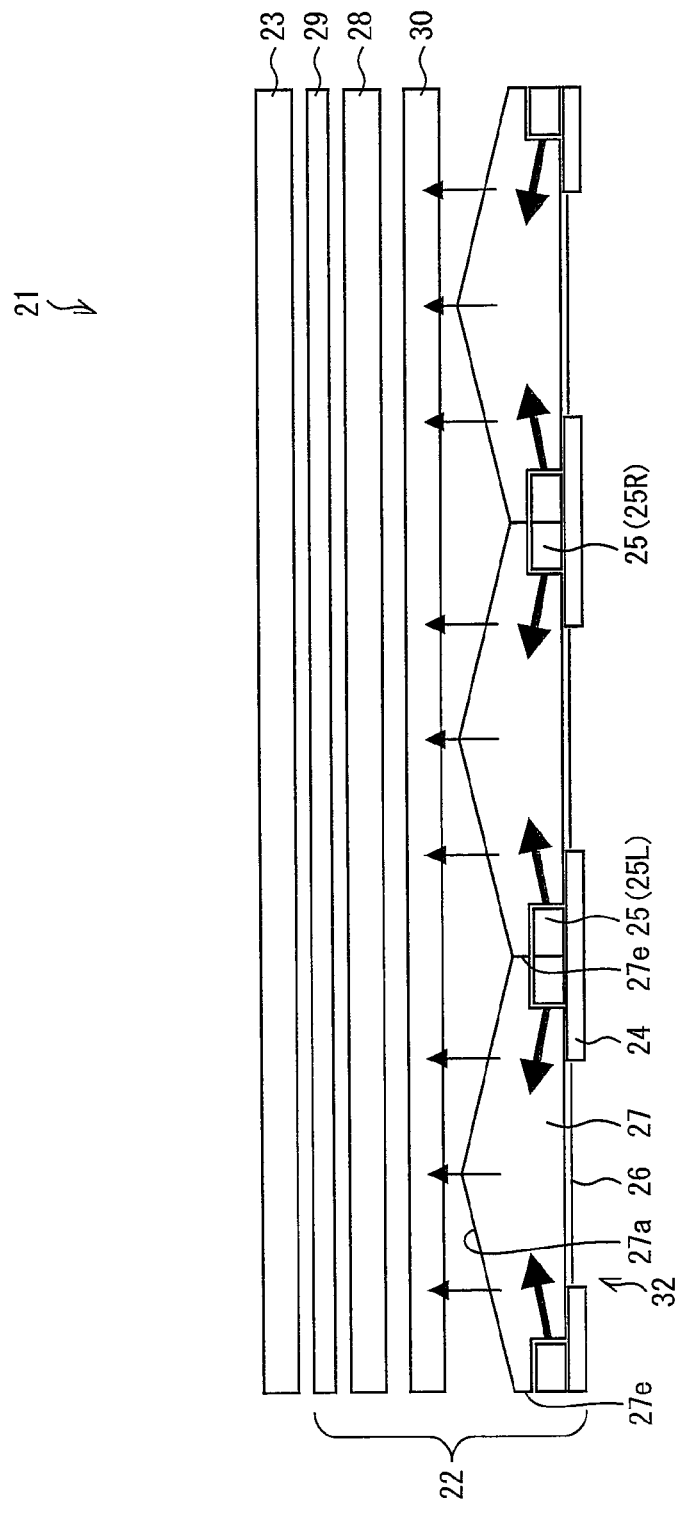
FIG. 8 is a cross sectional view schematically illustrating a configuration of a liquid crystal display device in accordance with Second Embodiment of the present invention.
Figure 11:
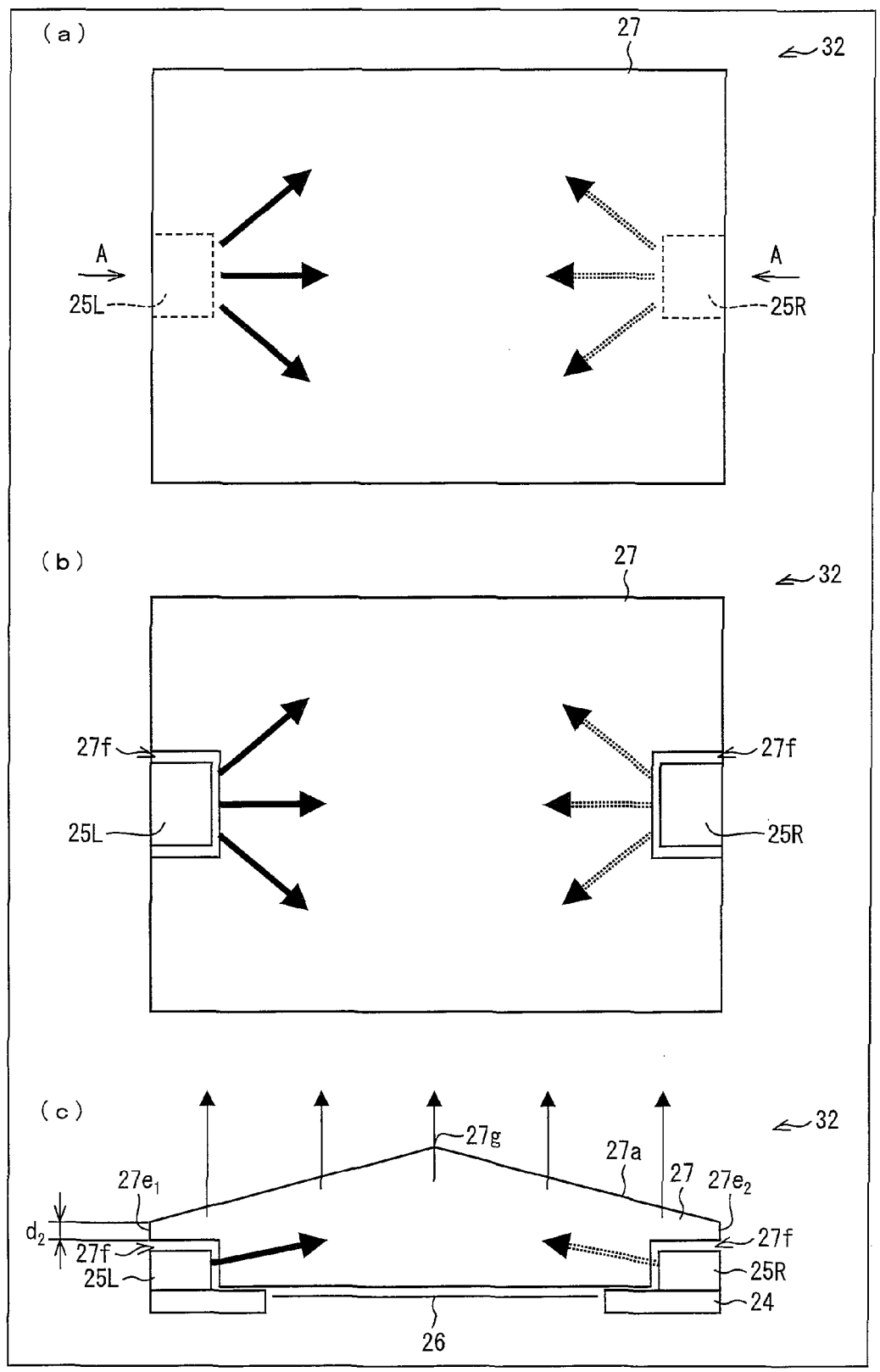

(a) of FIG. 11 is a plan view, seen from a side of the liquid crystal display panel, of the light source unit included in the liquid crystal display device shown in FIG. 8. (b) of FIG. 11 is a plan view, seen from a side of the backlight, of the light source unit included in the liquid crystal display device shown in FIG. 8. (c) of FIG. 11 is a cross sectional view, along an A-A line, of the light source unit shown in (a) of FIG. 11.

Figure 12:
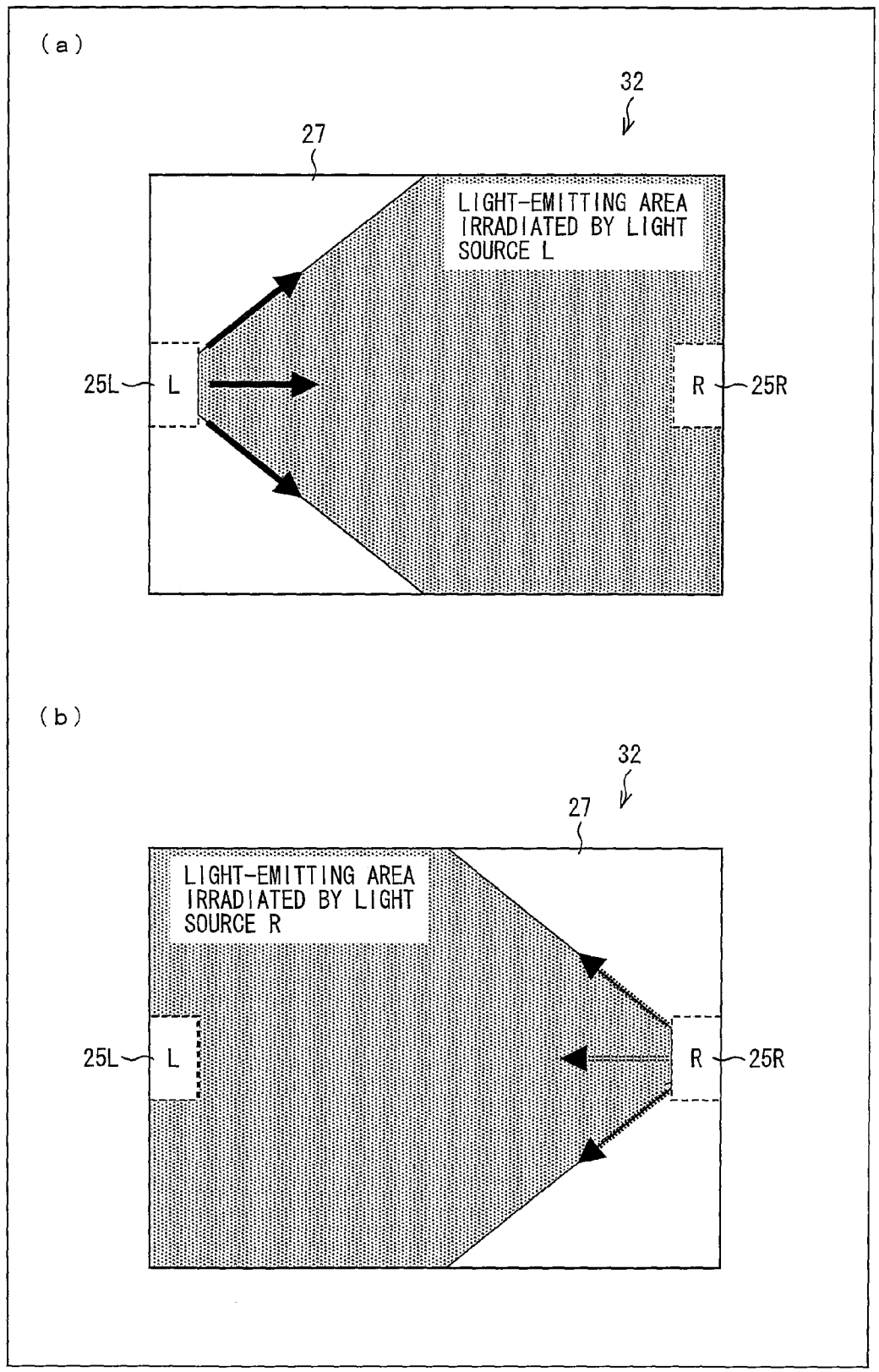

(a) of FIG. 12 is a view schematically illustrating a traveling direction of light from a light source disposed in one side (left side) of the light source unit. (b) of FIG. 12 is a view schematically illustrating a traveling direction of light from a light source disposed in another side (right side) of the light source unit.

Figure 13:
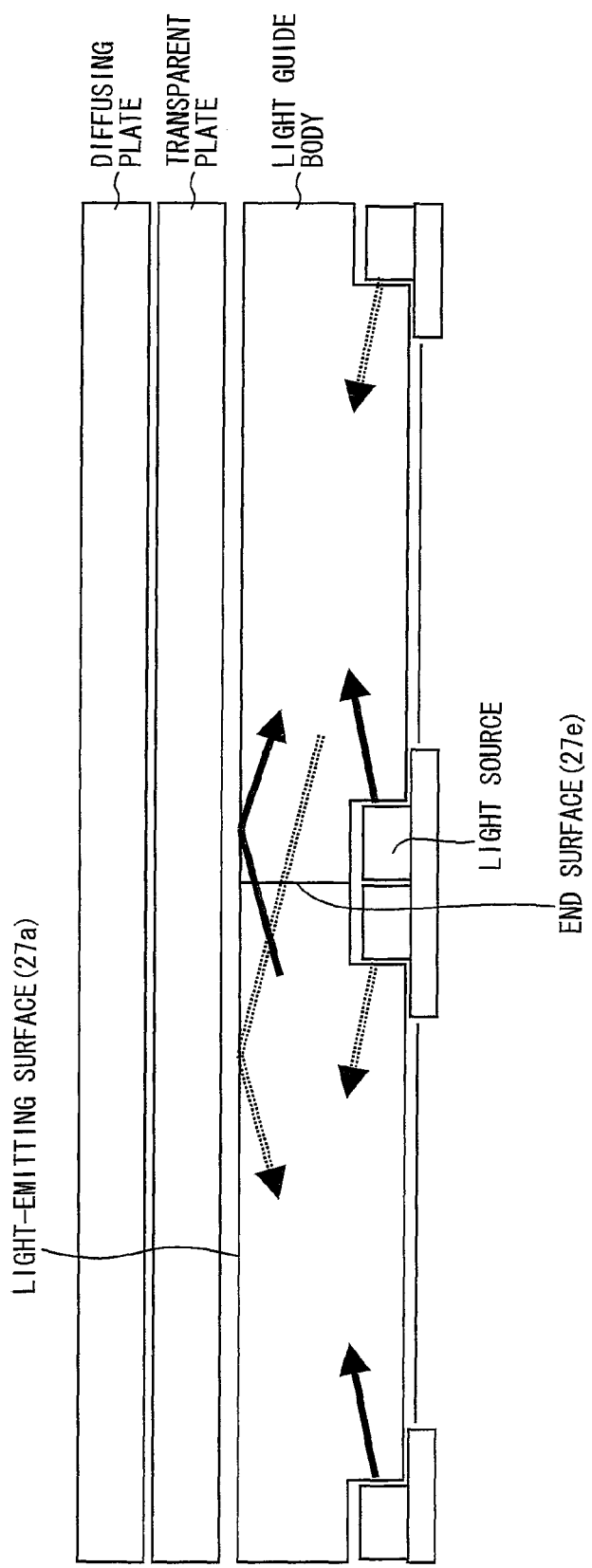

FIG. 13 is a cross sectional view schematically illustrating a configuration of a tile-type backlight in which two adjoining light source units are arranged without any gap therebetween.

Figure 14:
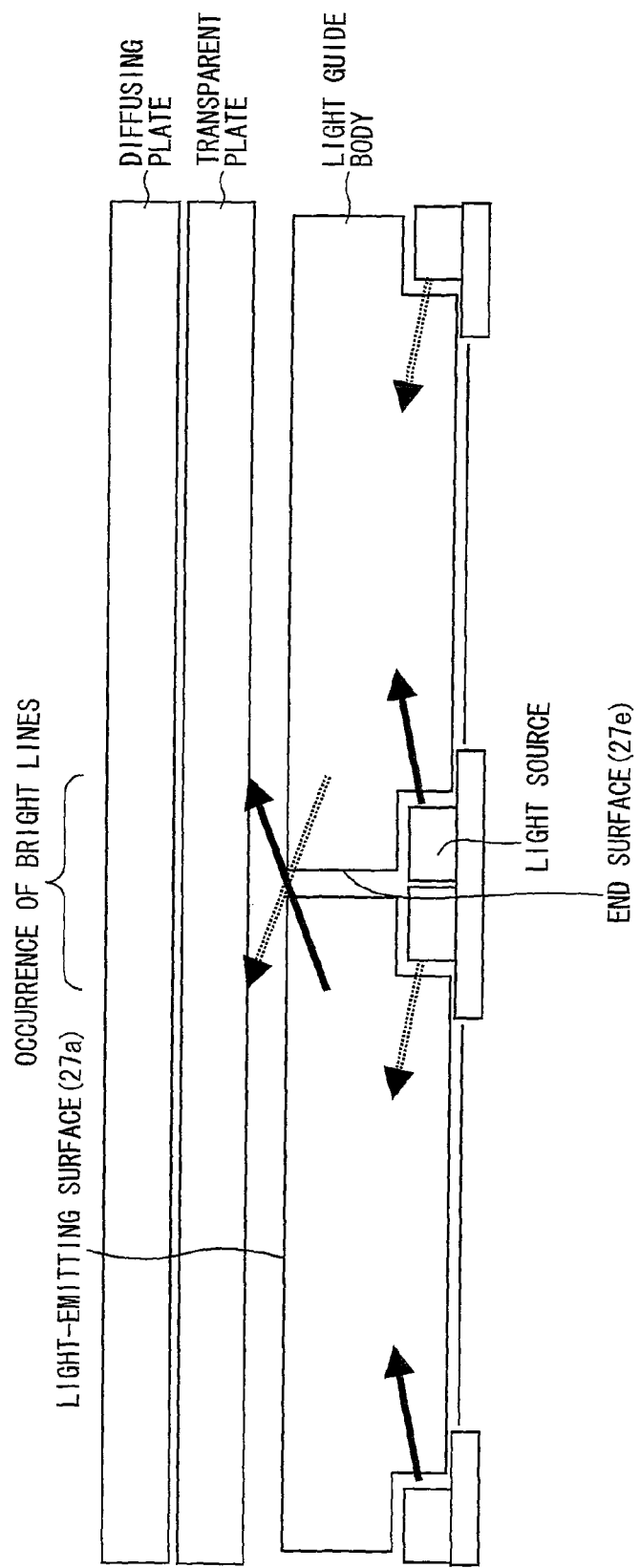

FIG. 14 is a cross sectional view schematically illustrating a configuration of the tile-type backlight in practical use.

REFERENCE SIGNS LIST 1, 21 Liquid crystal display device
2, 22 Backlight (illumination device)
3, 23 Liquid crystal display panel
4, 24 Substrate
5 Light source (LED, cold cathode fluorescent lamp)
25 (25L, 25R) Light source (LED)
6, 26 Reflecting sheet
7, 17, 27 Light guide body
7a, 27a Light-emitting surface (of a light guide body)
7b, 17b Light-emitting section
7c Light guide section
7e, 27e End surface
8, 28 Diffusing plate
9, 29 Optical sheet
10, 30 Transparent plate
12, 32 Light source unit

DESCRIPTION OF EMBODIMENTS

First Embodiment

The following is an explanation of First Embodiment of the present invention, with reference to FIGS. 1 to 7. It must be noted that the present invention is not limited to this embodiment.

Below is an explanation of an illumination device used as a backlight in a liquid crystal display device in accordance with the present embodiment.

Figure 1:
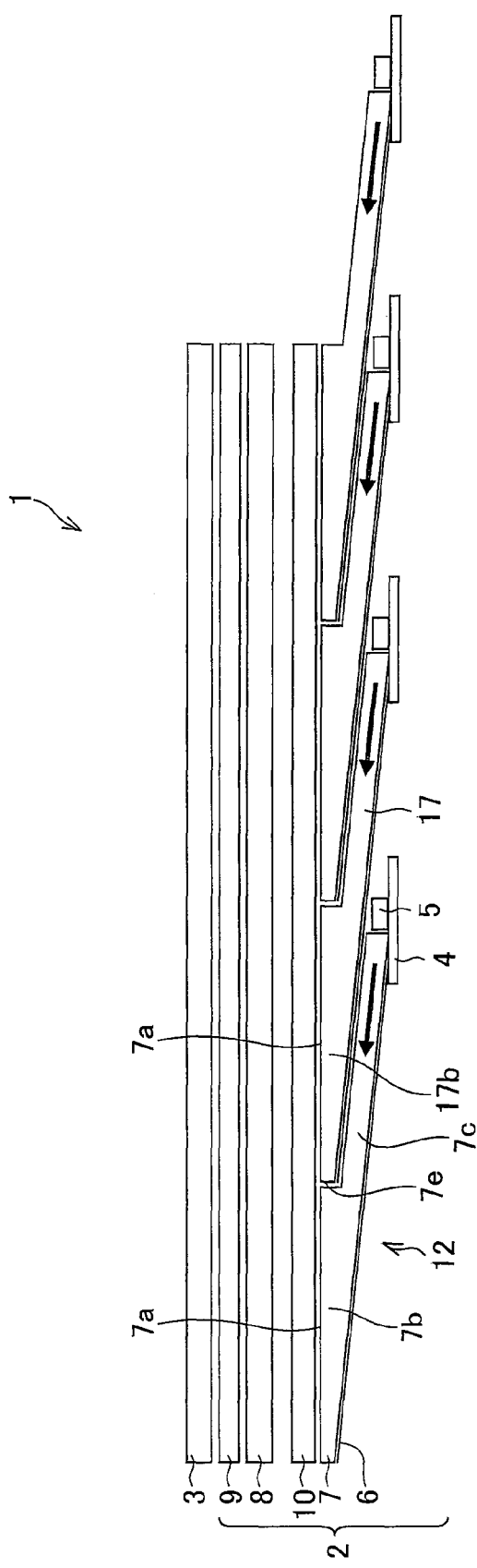
FIG. 1 is a cross sectional view schematically illustrating a configuration of a liquid crystal display device in accordance with First Embodiment of the present invention.

FIG. 1 is a cross sectional view schematically illustrating a configuration of a liquid crystal display device 1 in accordance with the present embodiment. The liquid crystal display device 1 includes a backlight 2 (illumination device) and a liquid crystal display panel 3, which is disposed so as to face the backlight 2.

The liquid crystal display panel 3 is similar to general liquid crystal display panels used in conventional liquid crystal display devices. The liquid crystal display panel 3 is for example configured so as to include (i) an active-matrix substrate including a plurality of TFTs (thin-film transistors), (ii) a CF substrate facing the active-matrix substrate, and (iii) a liquid crystal layer provided between these two substrates by use of a sealing material (the above (i), (ii) and (iii) are not shown in FIG. 1).

Below is a detailed explanation of a configuration of the backlight 2 included in the liquid crystal display device 1.

The backlight 2 is disposed behind (i.e., on a side opposite to a display surface) of the liquid crystal display panel 3. As shown in FIG. 1, the backlight 2 includes a substrate 4, a light source 5, a reflecting sheet 6, a light guide body 7, a diffusing plate 8, an optical sheet 9, and a transparent plate 10. The backlight 2 includes at least two light guide bodies. For convenience of explanation, the present embodiment will be described by taking one light guide body 7 and another light guide body 17 as one example. Further, if not otherwise specified, the one light guide body 7 will be explained as a representative example for both of the light guide body 7 and the light guide body 17.

The light source 5 is, for example, a side light emitting-type light-emitting diode (LED) or a cold cathode fluorescent lamp (CCFL). The following will describe an example where an LED is used as the light source 5. Using as the light source 5 a side light emitting-type LED including R, G and B chips molded into a single package makes it possible to provide an illumination device having a wide range of color reproduction. Note that the light source 5 is disposed on the substrate 4.

The light guide body 7 causes light from the light source 5 to be surface-emitted from a light-emitting surface 7a. The light-emitting surface 7a is a surface used to emit light towards an irradiation object. In the present embodiment, as shown in FIG. 1, the light guide bodies 7 are arranged to have a tandem structure. In other words, the light guide body 7 is configured as follows: the light guide body 7 includes (i) a light-emitting section 7b having the light-emitting surface 7a and (ii) a light guide section 7c guiding light from the light source 5 to the light-emitting section 7b. Further, respective thicknesses of the light-emitting section 7b and the light guide section 7c are different at least in a part where the light-emitting section 7b is connected to the light guide section 7c. Furthermore, a light-emitting section 17b of the another light guide body 17 (a light guide body of a second light source unit) is disposed so as to be placed on the light guide section 7c of the light guide body 7 (a light guide body of a first light source unit). In this way, a planar light-emitting surface (i.e., an overall light-emitting surface of the backlight 2; a light-emitting area) is formed by respective light-emitting surfaces 7a of a plurality of light guide bodies 7, 17, . . . . It must be noted that the reference sign 7e indicates an end surface located the furthest away from the light source 5.

Figure 2:
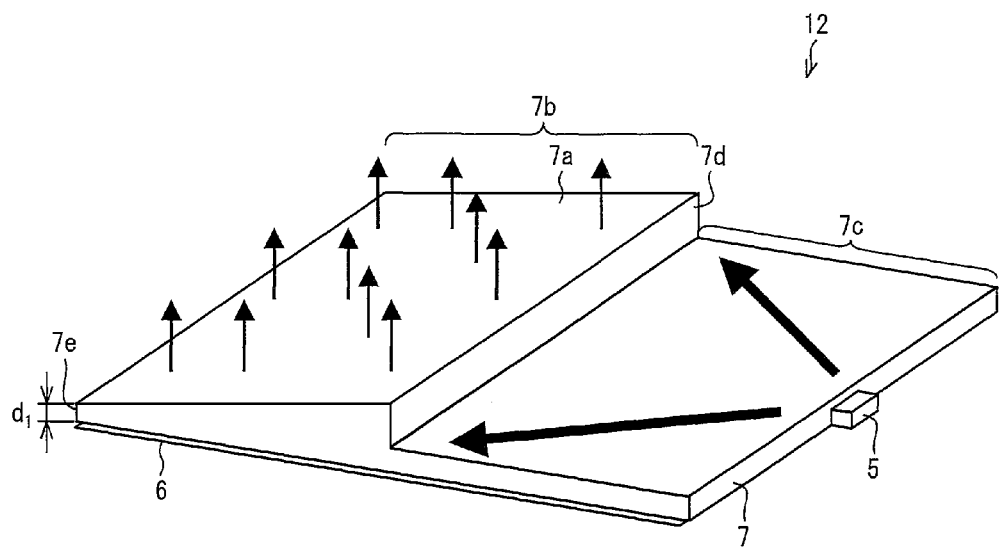
FIG. 2 is a perspective view schematically illustrating a configuration of a light source unit included in the liquid crystal display device.

FIG. 2 is a perspective view schematically illustrating a configuration of the light source unit 12 included in the liquid crystal display device 1 shown in FIG. 1. The light source unit 12, which is used to diffuse light emitted from the light source 5 for surface-emission, includes the light source 5, the substrate 4 (FIG. 1), the reflecting sheet 6, and the light guide body 7. As shown in FIG. 2, light emitted from the light source 5 enters the light guide section 7c of the light guide body 7, propagates through the light guide section 7c, and reaches the light-emitting section 7b. On a front surface (light-emitting surface 7a) of the light-emitting section 7b of the light guide body 7 or on a back surface of the light guide body 7, a process or treatment is conducted in order to allow guided light to be emitted to a front side (not shown on FIG. 2). The light is emitted from the light-emitting surface 7a of the light guide body 7 towards the liquid crystal display panel 3. Concrete examples of a method for the process or the treatment conducted on the light-emitting section 7b of the light guide body 7 include prism processing, texturing, and printing; however, there is no limitation in this regard, and any appropriate publicly-known method may be used.

Further, the light guide body 7 is mainly made from a transparent resin such as polycarbonate (PC) or polymethylmethacrylate (PMMA); however, there is no limitation in this regard; a material having high light transmittance is preferable. Further, the light guide body 7 may be formed by a processing method such as injection molding, extrusion molding, hot pressing, or cutting; however, there is no limitation in this regard, provided that a chosen processing method provides similar features.

The reflecting sheet 6 is provided so as to be in contact with the back surface of the light guide body 7 (i.e., a surface opposite to the light-emitting surface 7a). The reflecting sheet 6 reflects light so as to cause the light-emitting surface 7a to emit as much light as possible. The present embodiment includes a plurality of light guide bodies; therefore, a reflecting sheet 6 is provided for each light guide body 7, 17, . . . .

The diffusing plate 8 is disposed so as to face the light-emitting surface 7a, and to cover an entire planar light-emitting surface formed by light-emitting surfaces 7a of the light guide bodies 7, 17, . . . . The diffusing plate 8 diffuses light emitted from the light-emitting surface 7a of the light guide body 7 and irradiates the light onto the optical sheet 9 (explained below). The present embodiment uses, as the diffusing plate 8, a 2.0 mm-thickness SUMIPEX E RMA10 (manufactured by Sumitomo Chemical Co., Ltd.). Further, the diffusing plate 8 may be disposed at a predetermined distance from the light-emitting surface 7a. For example, the predetermined distance is set to 3.0 mm.

The optical sheet 9 includes a plurality of stacked sheets disposed on the front side of the light guide body 7. The optical sheet 9 makes uniform and collects light emitted from the light-emitting surface 7a of the light guide body 7, and emits the light towards the liquid crystal display panel 3. That is, the optical sheet 9 may for example be: a diffusing sheet for collecting and dispersing light; a lens sheet for collecting light to increase a luminance in a frontward direction (direction toward the liquid crystal display panel); or a polarizing and reflecting sheet for improving luminance of the liquid crystal display device 1 by reflecting one polarizing element of the light and transmitting another polarizing element. It is preferable that these sheets are used in combination as needed, depending on a price and a performance of the liquid crystal display device 1. In the present embodiment, as one example, Light-up 250 GM2 (manufactured by Kimoto Co., Ltd.) and/or the like is used as the diffusing sheet, Thick RBEF (manufactured by Sumitomo 3M Limited) and/or the like is used as the prism sheet, and DBEF-D400 (manufactured by Sumitomo 3M Limited) and/or the like is used as the polarizing sheet.

The transparent plate 10 is used in order to maintain a predetermined distance between the light guide body 7 and the diffusing plate 8, which forms a light dispersion area. The transparent plate 10 is made from a light-transmitting material such as a polyethylene film. It must be noted that the transparent plate 10 may be omitted, and the light guide body 7 and the diffusing plate 8 may be disposed so as to face each other.

Figure 6:
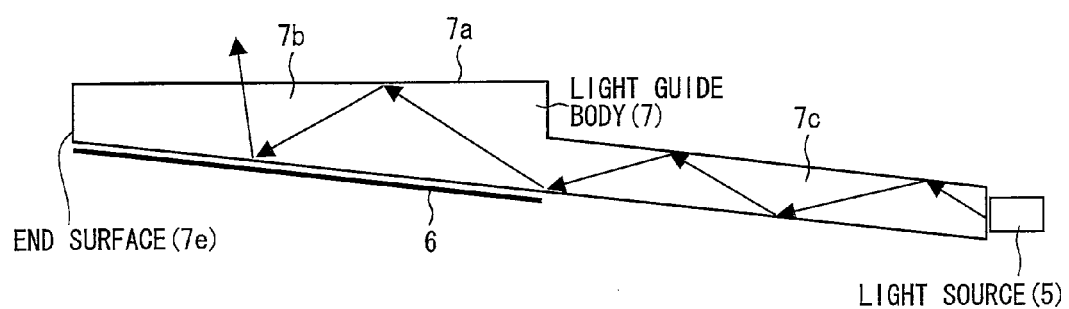
FIG. 6 is a view schematically illustrating a traveling direction of light propagating through a light guide body.

With the members configured as above, as shown in FIGS. 2 and 6, light emitted from the light source 5 propagates through the light guide body 7 while being diffused and reflected. The light is then emitted from the light-emitting surface 7a, and passes through the diffusing plate 8 and the optical sheet 9, so as to reach the liquid crystal display panel 3.

The following will describe why conventional backlights have non-uniform luminance.

As shown in FIG. 6, light from the light source 5 enters the light guide section 7c of the light guide body 7 at a certain critical angle, and propagates through the light guide section 7c while being repeatedly total-reflected, so as to reach the light-emitting section 7b. Then, by being reflected by the reflecting sheet 6 disposed on the back side of the light-emitting section 7b, the light is emitted from the light-emitting surface 7a. In this way, because most of the light emitted from the light source 5 is repeatedly total-reflected inside the light guide body 7, the light decreases its amount as becoming more distant from the light source.

Figure 7:
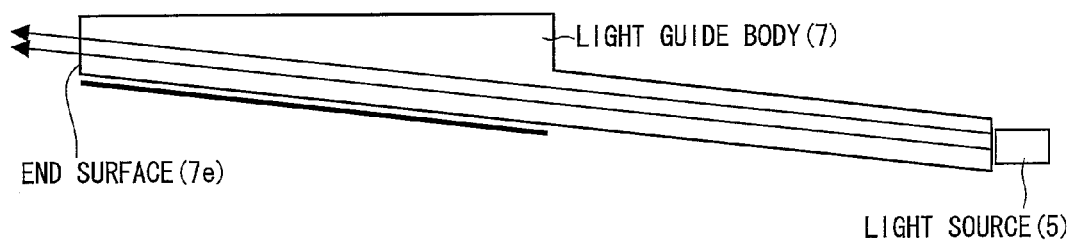
FIG. 7 is a view schematically illustrating a traveling direction of light propagating through a light guide body.

However, as shown in FIG. 7, a part of the light emitted from the light source 5 reaches directly an end surface 7e located the furthest away from the light source 5, without being total-reflected inside the light guide body 7. Such light has a higher intensity than the light emitted from the light-emitting surface 7a, because there is no loss in its amount caused by the total reflection.

Figure 5:
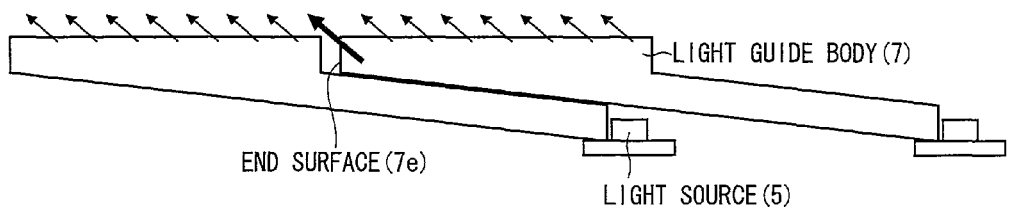
FIG. 5 is a cross sectional view schematically illustrating an arrangement of the light guide bodies in the tandem-type backlight in practical use.

In this regard, as shown in FIG. 5, light guide bodies arranged in a tandem structure have a gap at a boundary between a light-emitting section of one of the light guide bodies and a light-emitting section of another one of the light guide bodies adjoining the one light guide body; therefore, light from the light source is directly emitted to the outside through an end surface 7e of the light guide body. As a result, this highly intense light appears as a bright line, thereby causing non-uniform luminance as a whole.

Patent Literature 3 mentions, in paragraph [0076], that a thickness of the thinnest portion of a rear end of a light guide body is set to 0.2 mm. However, such thickness is still not sufficient to reduce an amount of light emitted from an end surface of the light guide body, and therefore hardly improves the problem of bright lines.

In order to deal with this, in the present embodiment, a thickness d1 of the light guide body in its end surface 7e is set to 0.05 mm or more and not more than 0.15 mm, in order to reduce an amount of light emitted from the end surface 7e (another end portion; opposite to one end portion of the light guide body 7 in which the light source 5 is disposed) of the light guide body, and accordingly to suppress an amount of light of the bright lines.

Setting the thickness d1 of the light guide body to 0.15 mm or less makes it possible to suppress the brightness of the bright lines to a degree with which no problem occurs in practical use. Further, setting the thickness d1 of the light guide body to 0.05 mm or more allows the end portion of the light guide body to be less likely to break, thereby maintaining a strength of the device.

Figure 3:
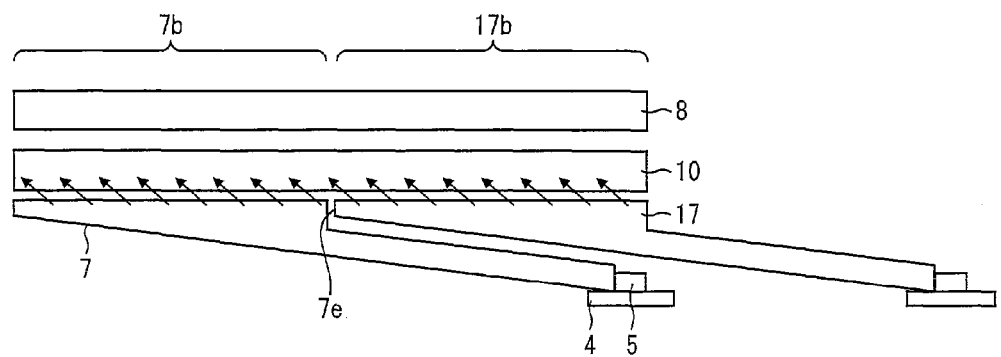
FIG. 3 is a cross sectional view illustrating an enlargement of a part of the liquid crystal display device shown in FIG. 1.
Figure 4:
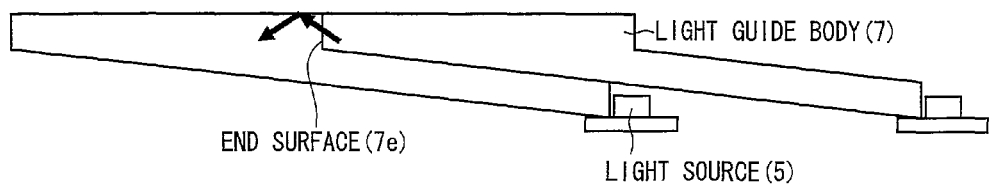
FIG. 4 is a cross sectional view schematically illustrating an arrangement of light guide bodies included in a tandem-type backlight.

FIG. 3 is a cross sectional view showing an enlargement of a part of the liquid crystal display device 1 illustrated in FIG. 1. As shown in FIG. 3, the respective thicknesses of the light guide bodies 7 and 17 in their of the end surfaces 7e are smaller than those of conventional ones. Accordingly, it is possible to reduce the amount of high-intensity light emitted from the end surface 7e of the light guide body 17. As a result, it is possible to suppress the luminance of the light that directly reaches the end surface 7e from the light source 5 and is then emitted from the extremity surface 7e.

Thus, with the configuration of the present invention, it is possible to further improve luminance uniformity compared to conventional configurations.

The thickness of the light guide body is set as above in order to reduce the amount of light of bright lines created by high-intensity light emitted from the end surfaces 7e of light guide bodies, each of the end surfaces 7e being located in a boundary between two adjoining light guide bodies. As such, in other words, the end portion of the light guide body corresponding to an area where a bright line appears because of light from the light source has a thickness from 0.05 mm to 0.15 mm.

Thus, because the liquid crystal display device 1 in accordance with the present embodiment includes the backlight 2 as described above, the liquid crystal display device 1 is able to emit light more uniformly towards the liquid crystal display panel 3, thereby improving display quality.

Further, with an illumination device in accordance with the present invention, it is possible to further reduce the thickness of the illumination device, while maintaining luminance uniformity. Therefore, the illumination device is preferably used as a backlight of a liquid crystal display device having a total thickness of 20 mm or less.

Furthermore, an illumination device in accordance with the present invention has excellent luminance uniformity even in a case where the light-emitting area becomes larger. Therefore, particularly, the illumination device is preferably used as a backlight of a liquid crystal display device having a large screen.

However, the present invention may be used as a backlight of any type of liquid crystal display device and is not limited to the above.

Second Embodiment

Next is an explanation of Second Embodiment of the present invention, with reference to FIGS. 8 to 14.

The foregoing has explained a tandem-type backlight in connection with First Embodiment. The explanation of the present embodiment will focus on a tile-type backlight including a plurality of light guide bodies arranged on a common flat surface without overlap.

FIG. 8 is a cross sectional view schematically illustrating a configuration of a liquid crystal display device 21 in accordance with the present embodiment. The liquid crystal display device 21 includes a backlight 22 (illumination device), and a liquid crystal display panel 23 disposed so as to face the backlight 22. The liquid crystal display panel 23 has a configuration similar to that of the liquid crystal display panel 3 of First Embodiment.

Next is an explanation of a configuration of the backlight 22 included in the liquid crystal display device 21.

The backlight 22 is disposed behind (i.e., on a side opposite a display surface) of the liquid crystal display panel 23. As shown in FIG. 8, the backlight 22 includes a substrate 24, a light source 25, a reflecting sheet 26, a light guide body 27, a diffusing plate 28, an optical sheet 29, and a transparent plate 30.

The light source 25 is for example a point light source, such as a side light emitting-type light-emitting diode (LED). The following will describe an example where an LED is used as the light source 25. By using as the light source 25 a side light emitting-type LED including R, G, and B chips molded into a single package, it is possible to provide an illumination device having a wide range of color reproduction. The light source 25 is disposed on the substrate 24.

The light guide body 27 causes light from the light source 25 to be surface-emitted from a light-emitting surface 27a. The light-emitting surface 27a is a surface used to emit the light toward an irradiation object.

Other members of the backlight 22 have substantially the same configurations as those of the backlight 2 in accordance with First Embodiment. Accordingly, the explanations thereof are omitted here.

In the present embodiment, the backlight 22 includes at least two light guide bodies. In other words, the backlight 22 includes a plurality of light source units 32 arranged on a common flat surface, each of the light source units 32 being formed by combining a light guide body 27 and a light source 25.

Figure 9:
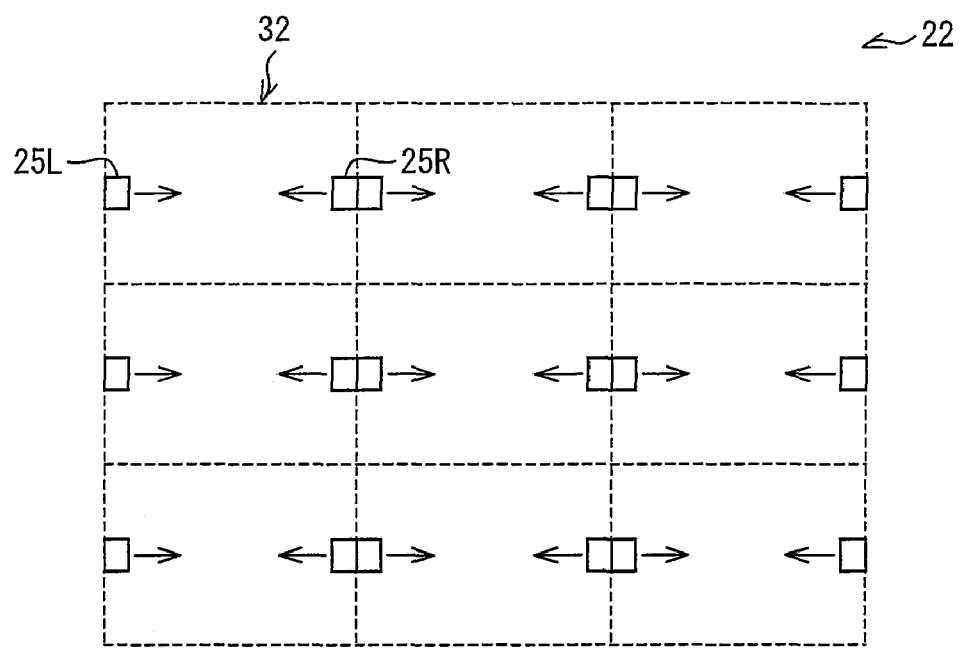
FIG. 9 is a plan view schematically illustrating a configuration of a backlight included in the liquid crystal display device shown in FIG. 8.

FIG. 9 is a plan view schematically illustrating a configuration of the backlight 22. As shown in FIG. 9, in the backlight 22, a plurality of light source units 32 each including two light sources 25L and 25R (a pair of light sources) are aligned in rows and columns. In this way, the backlight 22 in accordance with the present embodiment includes the plurality of light source units 32 arranged similarly to tiles covering a pavement, and thus is called a tile-type backlight.

Figure 10:
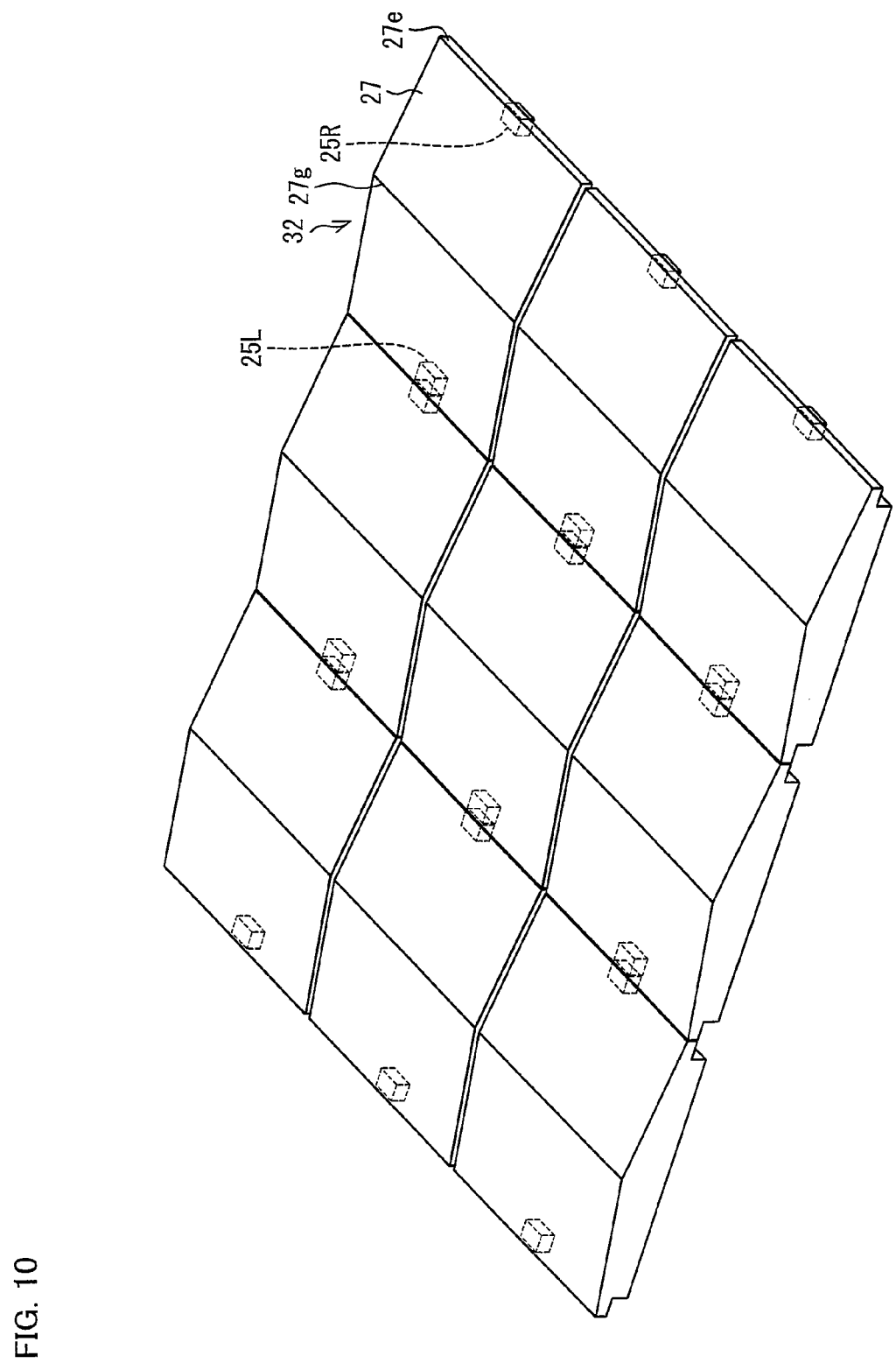
FIG. 10 is a perspective view schematically illustrating an arrangement of light source units included in the backlight shown in FIG. 9.

FIG. 10 is a perspective view of the light source units 32 arranged as shown in FIG. 9. As shown in FIG. 10, the light guide body 27 included in each light source unit 32 is shaped so as to be thicker as becoming more distant from end surfaces (ends) in which the light sources 25R and 25L are respectively provided. In other words, a light-emitting surface 27a of each light guide body 27 has a chevron shape having two sloped surfaces and a "ridge" 27g. A ridge 27g of one light guide body 27 is aligned with a ridge 27g of another light guide body 27.

FIG. 11 shows a configuration of one of the light source units 32 included in the backlight 22. (a) of FIG. 11 is a plan view (top view) of the light source unit 32 seen from a side of the liquid crystal display panel 23 (this side is called "upper side"). (b) of FIG. 11 is a plan view (bottom view) of the light source unit 32 seen from a side opposite to that in (a) of FIG. 11. (c) of FIG. 11 is a cross sectional view, along an A-A line, of the light source unit 32 shown in (a) of FIG. 11. As shown in (c) of FIG. 11, the light-emitting surface 27a of the light guide body 27 is shaped in a chevron having the ridge 27g as its apex.

The light source unit 32 shown in FIG. 11 includes (i) two light sources 25L and 25R (making a pair) and (ii) the light guide body 27 for surface-emission of light emitted from the light sources. Each of the light source 25L and 25R is contained in a caved recess 27f formed in the light guide body 27. The light sources 25L and 25R disposed so as to face each other. Note that the light sources 25L and 25R are placed on the substrate 24. Further, as shown in FIG. 11, directions (respectively represented by a continuous-line arrow and a dotted-line arrow) in which light is emitted from the light sources 25L and 25R are set so that light outputted from one of the light sources is emitted towards the other of the light sources.

In this way, in the light source unit 32, the two point light sources facing each other are disposed so that light emitted from one of the point light sources reaches a region where light emitted from the other of the point light sources cannot reach, and vice versa.

FIG. 12 schematically illustrates respective traveling directions of light from the light sources 25L and 25R included in the light source unit 32. (a) of FIG. 12 illustrates a traveling direction of the light from the light source 25L provided in a left side of the light source unit seen from above, and (b) of FIG. 12 illustrates a traveling direction of the light from the light source 25R provided in a right side of the light source unit seen from above.

As shown in FIG. 12, the light source 25L and the light source 25R are disposed to face each other in order that the light outputted from both of the light sources enters inside the light guide body 27. With this, respective light-emitting areas given by the light sources overlap each other. This results in light emission from the entire light-emitting surface 27a of the light guide body 27.

In the present embodiment, by arranging a plurality of such light source units 32, it is possible to obtain a large backlight having no dark areas. Further, as shown in FIG. 8, the backlight 22 in accordance with the present embodiment includes adjoining light source units 32 (first light source unit and second light source unit) arranged on a common flat surface so as not to overlap each other. Thus, respective light-emitting surfaces 27a of the plurality of light guide bodies 27 constitute an overall light-emitting surface (light-emitting area) of the backlight 22.

As shown in FIG. 8, light emitted from the light source 25 as above propagates through the light guide body 27 while being diffused and reflected. The light is then emitted from the light-emitting surface 27a, passes through the diffusing plate 28 and the optical sheet 29, so as to reach the liquid crystal display panel 23.

In this regard, as well as in the tandem-type backlight, the tile-type backlight also has the problem of impaired luminance uniformity due to a bright line caused by a gap created between two adjoining light guide bodies. The following will describe why luminance becomes non-uniform.

As was explained above with reference to FIG. 6, light emitted from the light source 25 is total-reflected repeatedly inside the light guide body 27, and is then emitted from the light-emitting surface 27a. However, similarly to the case shown in FIG. 7, a part of the light outputted from the light source 25 reaches directly the end surface 27e located the furthest away from the light source 25 (see (c) of FIG. 11), without being total-reflected inside the light guide body 27. Such light has a higher intensity than the light emitted from the light-emitting surface 27a, because there is no loss in its amount caused by the total reflection.

Assume that, as shown in FIG. 13, one light guide body (on the left in FIG. 13) and another light guide body (on the right in FIG. 13) adjoining the one light guide body are arranged without any gap therebetween. In this case, no bright lines appear. This is because that light leaking from an end surface 27e of the one light guide body enters an end surface 27e of the another light guide body, total-reflected inside the another light guide body, and is then emitted from the light-emitting surface 27a of the another light guide body.

In practical use, however, as shown in FIG. 14, a gap is created at a boundary between one light guide body and another light guide body adjoining the one light guide body; therefore, light emitted from the light source is directly emitted to the outside from the end surface 27a of the light guide body. As a result, this high-intensity light appears as a bright line, thus causing non-uniform luminance as a whole.

In order to deal with this, in the present embodiment, a thickness d2 (see (c) of FIG. 11) of the light guide body in its end surface 7e is set to 0.05 mm or more and not more than 0.15 mm, in order to reduce an amount of light emitted from the end surface 27e of the light guide body, and accordingly to suppress an amount of light of the bright lines.

Further, in the present embodiment, as shown in (c) of FIG. 11, the light guide body is shaped so as to be thicker as becoming more distant from the end surfaces 27e of the light guide body 27. In other words, the light-emitting surface 27a of the light guide body 27 is formed by two sloped surfaces inclined toward the ridge 27g.

Setting the thickness d2 of the light guide body to 0.15 mm or less as mentioned above makes it possible to suppress the brightness of the bright lines to a degree with which no problem occurs in practical use. In other words, the thickness d2 set to 0.15 mm or less allows light from the light source 25R to be emitted from the end surface 27e1 (another end portion) after being weakened sufficiently, the end surface 27e1 being opposite to the light source 25R provided in one end portion of the light guide body 27. In contrast, the thickness d2 set to 0.15 mm or less allows light from the light source 25L to be emitted from another end surface 27e2 (another end portion) after being weakened sufficiently, the another end surface 27e2 being opposite to the light source 25L provided in another end portion of the light guide body 27.

Further, setting the thickness d2 of the light guide body to 0.05 mm or more allows the end portion of the light guide body to be less likely to break, thereby maintaining a strength of the device.

Thus, with the configuration of the present embodiment, it is possible to further improve luminance uniformity compared to conventional configurations.

The thickness of the light guide body is set as above in order to reduce the amount of light of bright lines created by high-intensity light emitted from the end surfaces 27e of light guide bodies, each of the end surfaces 27e being located in a boundary between two adjoining light guide bodies. As such, in other words, the end portion of the light guide body corresponding to an area where a bright line appears because of light from the light source has a thickness from 0.05 mm to 0.15 mm.

Thus, because the liquid crystal display device 21 in accordance with the present embodiment includes the above-described backlight 22, the liquid crystal display device 21 is able to emit light more uniformly towards the liquid crystal display panel 23, thereby improving display quality.

An illumination device in accordance with the present invention includes a plurality of light source units each including (i) at least one light source and (ii) a light guide body for surface-emitting light which has come from the at least one light source, the light guide body having one end portion in which the at least one light source is provided, and the light guide body having another end portion, opposite to the one end portion, whose thickness is from 0.05 mm to 0.15 mm.

Further, the illumination device in accordance with the present invention includes a plurality of light source units each including (i) at least one light source and (ii) a light guide body for surface-emitting light which has come from the at least one light source, the light guide body having an end portion whose thickness is from 0.05 mm to 0.15 mm, the end portion corresponding to an area in which a bright line appears due to light from said at least one light source.

The present invention makes it possible to further improve luminance uniformity in illumination devices each including a plurality of light guide bodies.

The detailed explanations of the invention which were given above in connection with concrete embodiments and examples are merely intended to clarify the technical contents of the present invention. The present invention should not be construed to be limited to these examples and embodiments, and various modifications can be exercised within the spirit of the invention and the scope of the following claims.

INDUSTRIAL APPLICABILITY

An illumination device in accordance with the present invention is applicable as a backlight of a liquid crystal display device. Especially, the illumination device in accordance with the present invention is advantageously applicable as a backlight of a large or thin liquid crystal display device.

The invention claimed is:
1. An illumination device comprising:
a plurality of light source units each including at least one respective light source and a respective light guide body; wherein
each of the light guide bodies:
(i) includes a plate-shaped light-emitting section including a planar light-emitting surface; and a plate-shaped light guide section arranged to protrude, in a lateral direction of the light-emitting section, from a side surface of the light-emitting section that intersects the light-emitting surface; and (ii) is arranged to guide, from the light guide section to the light-emitting section, light which has entered the light guide section from a corresponding light source provided in an end portion of the light guide section, the end portion being a portion of the light guide section that is furthest away from the side surface;

the light-emitting surfaces of the respective light guide bodies are arranged on a common surface such that, when seen from a normal direction of the light-emitting surfaces, the light guide section of one of the light guide bodies overlaps with the light-emitting surface of another one of the light guide bodies which is adjacent to the one of the light guide bodies such that the respective light guide bodies together define a single light-emitting surface as a whole;

the light-emitting section includes one end portion in which the light guide section is provided and another end portion which is a portion of the light-emitting section that is furthest away from the one end portion of the light-emitting section and which has a thickness from about 0.05 mm to about 0.15 mm.

2. An illumination device comprising:

a plurality of light source units each including at least one respective light source and a respective light guide body; wherein each of the light guide bodies includes:
  a light-emitting surface; and
  at least one cave-shaped recess provided in at least one end portion of the light-emitting surface;

each of the at least one light source is contained within a corresponding one of the at least one cave-shaped recess;

the light guide bodies are adjacent to each other on a common flat surface without overlapping one another so that the light-emitting surfaces of the respective light guide bodies together define a single light-emitting surface as a whole;

the light guide bodies each include one end portion in which the at least one light source is provided and another end portion which is opposite to the one end portion and which has a thickness from about 0.05 mm to about 0.15 mm.

3. A liquid crystal display device comprising, as a backlight, an illumination device according to claim 1.

4. The liquid crystal display device according to claim 3, wherein the liquid crystal display device has an overall thickness of 20 mm or less.

5. The illumination device according to claim 2, wherein:
the at least one cave-shaped recess includes cave-shaped recesses which are provided in each of the light guide bodies in respective ones of the one end portions and the another end portions of light-emitting surface to face each other;

said at least one light source in each of the plurality of light source units comprises at least a pair of light sources; and the pair of light sources are disposed in the cave-shaped recesses so as to face each other.

6. The illumination device according to claim 5, wherein:
the light guide body is shaped so as to be thicker as becoming more distant from end portions in which the pair of light sources are provided, respectively.

7. A liquid crystal display device comprising, as a backlight, an illumination device according to claim 2.

8. The liquid crystal display device according to claim 7, wherein the liquid crystal display device has an overall thickness of 20 mm or less.

* * * * *